Figure 1:
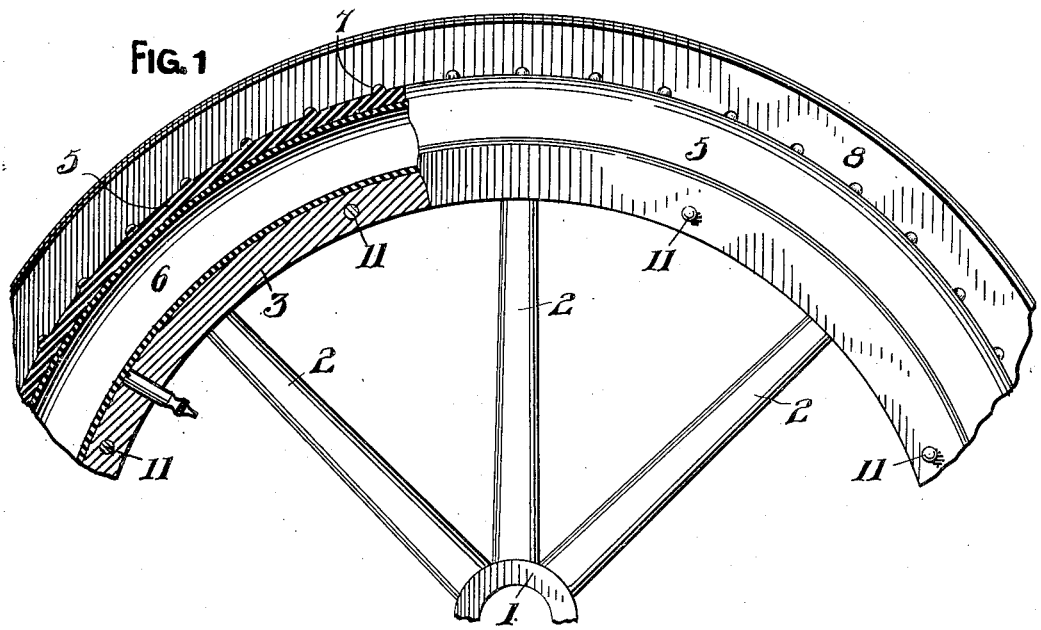

A. R. BURKETT.
VEHICLE WHEEL.
APPLICATION FILED DEC. 7, 1912.

1,077,799.

Patented Nov. 4, 1913.

WITNESSES

INVENTOR
Alvie R. Burkett
BY
ATTORNEYS

UNITED STATES PATENT OFFICE.

ALVIE R. BURKETT, OF MANNS CHOICE, PENNSYLVANIA.

VEHICLE-WHEEL.

1,077,799.  Specification of Letters Patent.  Patented Nov. 4, 1913.

Application filed December 7, 1912. Serial No. 735,566.

*To all whom it may concern:*

Be it known that I, ALVIE R. BURKETT, a citizen of the United States of America, residing at Manns Choice, in the county of Bedford and State of Pennsylvania, have invented certain new and useful Improvements in Vehicle-Wheels, of which the following is a specification, reference being had therein to the accompanying drawing.

This invention relates to vehicle wheels, and more particularly to a shoe for the pneumatic tires of automobiles and motor driven vehicles.

The primary object of my invention is to furnish a pneumatic tire with a shoe that protects the tire and adds resiliency to the same, thereby increasing the cushioning effect of a tire relatively to the body of a wheel.

Another object of this invention is to increase the roadworthiness of an automobile or other vehicle by providing a tire shoe that is practically puncture-proof and not liable to injury by stone bruise.

A further object of this invention is to provide a shoe for automobile tires that can be easily and quickly installed to afford a large supporting area for a wheel, thereby reducing to a minimum the liability of the wheel skidding or sliding upon smooth and wet surfaces particularly on a curved or irregular section of road.

A still further object of this invention is to accomplish the above results by a mechanical construction consisting of comparatively few parts, inexpensive to manufacture, durable and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 2:
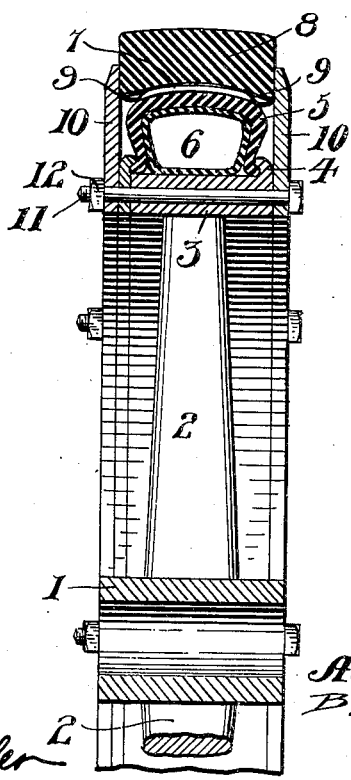

Figure 1 is a side elevation of a portion of a wheel partly broken away and partly in section, and Fig. 2 is a cross sectional view of a portion of the wheel.

Further describing my invention in detail with reference to the accompanying drawing wherein like numerals denote corresponding parts throughout: 1 denotes a hub having radially disposed spokes 2 supporting a felly 3, said felly having a clencher 4 of the ordinary and well known type for holding an outer tube 5 upon an inner pneumatic tube 6. The inner pneumatic tube 6 is of the ordinary and well known construction capable of being inflated and deflated. The outer tube 5 is provided with equally spaced transverse ribs 7, the purpose of which will presently appear.

8 denotes a shoe encircling the outer tube 5 and this shoe is substantially rectangular in cross section and is made of rubber or a resilient composition. The inner side of the shoe 8 has transverse grooves 9 to receive the ribs 7, said ribs and grooves interlocking the shoe 8 and the outer tube 5 whereby the shoe cannot shift circumferentially of the outer tube.

10 denotes circular side plates that engage the sides of the shoe and guide a compressing movement of the shoe relatively to the outer tube 5. The side plates 10 are retained in position by equally spaced bolts 11 and nuts 12, the bolts 11 passing through the felly 3 and serving to hold the detachable clencher member in position, as best shown in Fig. 2.

It is thought that the utility of my invention will be apparent without further description and while in the drawing there is illustrated a preferred embodiment of the invention, it is to be understood that the structural elements are susceptible to such variations and modifications as fall within the scope of the appended claim.

What I claim is:—

In combination a rim provided with an integral clencher at one side thereof, an inner tube mounted upon said rim, an outer shoe inclosing said inner tube and overlapped by said clencher, a flat annular member positioned against the other side of said rim and provided with an inwardly extending clencher overlapping said outer shoe, a tread shoe surrounding said outer shoe, circular side plates one arranged at one side of said rim and the other against said member, and means extending transversely of the rim, plates and flat annular member for securing them together.

In testimony whereof I affix my signature in the presence of two witnesses.

ALVIE R. BURKETT.

Witnesses:
MAX H. SROLOVITZ,
KATHERINE ERRETT.